United States Patent [19]
Yeh

[11] Patent Number: 6,112,266
[45] Date of Patent: Aug. 29, 2000

[54] HOST SIGNAL PROCESSING MODEM USING A SOFTWARE CIRCULAR BUFFER IN SYSTEM MEMORY AND DIRECT TRANSFERS OF SAMPLES TO MAINTAIN A COMMUNICATION SIGNAL

[75] Inventor: Han C. Yeh, Sunnyvale, Calif.

[73] Assignee: PC-Tel, Inc., Milpitas, Calif.

[21] Appl. No.: 09/010,813

[22] Filed: Jan. 22, 1998

[51] Int. Cl.[7] .................................................. G06F 13/00
[52] U.S. Cl. ............................. 710/52; 710/52; 710/62; 710/69; 711/110; 375/222
[58] Field of Search .............................. 395/200.67, 500, 395/97; 710/1, 2, 22, 48, 52, 56, 69, 62; 711/110; 375/222

[56] References Cited

U.S. PATENT DOCUMENTS

| | | | |
|---|---|---|---|
| 4,965,641 | 10/1990 | Blackwell et al. ........................... | 375/7 |
| 4,972,411 | 11/1990 | Fushimi et al. ....................... | 370/110.1 |
| 4,991,169 | 2/1991 | Davis et al. ............................... | 370/77 |
| 4,995,074 | 2/1991 | Goldman et al. ........................... | 379/97 |
| 5,375,228 | 12/1994 | Leary et al. ............................... | 395/575 |
| 5,625,845 | 4/1997 | Allran et al. .............................. | 395/856 |
| 5,678,059 | 10/1997 | Ramaswamy et al. .................. | 395/821 |
| 5,717,948 | 2/1998 | Michalina ............................... | 395/821 |
| 5,721,830 | 2/1998 | Yeh ................................... | 395/200.67 |
| 5,768,628 | 6/1998 | Priem ...................................... | 395/882 |
| 5,892,978 | 4/1999 | Munguia et al. ........................ | 395/853 |

FOREIGN PATENT DOCUMENTS

| | | | |
|---|---|---|---|
| 0 267 974 | 5/1988 | European Pat. Off. ........ | G06F 13/12 |
| 0 762 655 | 3/1997 | European Pat. Off. ......... | H03M 1/00 |
| WO 97/39409 | 10/1997 | WIPO ............................. | G06F 13/00 |

OTHER PUBLICATIONS

Disclosure Statement By Inventor (signed and dated Nov. 12, 1999).

"PCT1441 Host Signal Processing High Speed Data/Fax/Voice Modem Chip" data sheets (23 pages).

*Primary Examiner*—Thomas C. Lee
*Assistant Examiner*—Chun Cao
*Attorney, Agent, or Firm*—Skjerven, Morrill, MacPherson, Franklin & Friel LLP; David T. Millers

[57] ABSTRACT

An HSP communication system includes a host computer which executes a software portion of an HSP modem and a device containing a digital-to-analog converter (DAC). In response to interrupts, the host executes an update routine that generates and writes samples to a software circular buffer in memory of the host computer. The samples represent amplitudes of an analog signal complying with a desired communication protocol. A direct transfer moves samples from the software circular buffer to a hardware circular buffer the device, and the DAC converts the samples from the hardware circular buffer into an analog communication signal. In an exemplary embodiment, the hardware portion is coupled to a PCI bus in the host computer, and direct transfers are according to the PCI bus master protocol. In environments such as multi-tasking systems, the host may skip interrupts or otherwise not provide new samples when required. In this case, the direct transfers transfer old samples, and the DAC reuses samples from the software circular buffer to generate a maintenance signal. If direct transfers are delayed, the DAC can reuses samples from the hardware circular buffer to generate the maintenance signal. The maintenance signal typically does not convey correct data but is sufficient to maintain a communication link and prevent a remote device from disconnecting or entering a retrain mode. For a better maintenance signal, the circular buffers contains samples for an integral number of periods of the baud frequency of the desired protocol. Error correction and retransmission can replace incorrect or lost data.

22 Claims, 2 Drawing Sheets

HOST SIGNAL PROCESSING MODEM USING A SOFTWARE CIRCULAR BUFFER IN SYSTEM MEMORY AND DIRECT TRANSFERS OF SAMPLES TO MAINTAIN A COMMUNICATION SIGNAL

CROSS REFERENCE TO RELATED APPLICATIONS

This document is related to U.S. Pat. No. 5,721,830 and is related to the U.S. Pat. No. 5,787,305, both of which are hereby incorporated by reference in their entirety.

BACKGROUND OF THE INVENTION

1. Field of the Invention

The invention relates to communication systems that use host signal processing (HSP), and in particular to interfaces and processes for maintaining a communication signal when a host computer skips a scheduled execution of a software portion of an HSP modem.

2. Description of Related Art

Host signal processing (HSP) uses a central processing unit (CPU) in a host computer to perform digital signal processing tasks that are more conventionally performed by hardware added to the host computer. For example, a conventional modem receives data from a host computer, converts the data to an analog signal in compliance with a communication protocol, and transmits the analog signal to a remote device. The conventional modem also receives an analog signal from the remote device, extracts data from the analog signal, and passes the data to the host computer. In an HSP modem, the host computer executes software that performs many of the conversions performed by a digital signal processor or other hardware in a conventional modem. Hardware in the HSP modem performs simple analog-to-digital and digital-to-analog conversions such as converting a received analog communication signal to a series of digital samples that represent amplitudes of the received signal. The host computer executes software that interprets the samples according to a communication protocol and derives the received data from the samples. The host computer also generates a series of output samples that represent amplitudes of a transmitted communication signal in compliance with the protocol, and hardware of the HSP modem converts the output samples into the transmitted signal. When compared to conventional modems, HSP modems have less complex (and less expensive) hardware because with HSP modems, the host computer performs many of the tasks performed by hardware in conventional modems. However, HSP modems use processing power of the host CPU, typically by periodically interrupting the host CPU.

Some communication protocols require that devices at both ends of a communication link transmit and receive constantly. The transmitted signal must be regular, even during a pause in data transmission, so that a receiving device recognizes that the transmitting device is still on the link. In such systems, an HSP modem generates regular interrupts to request new samples that are needed to maintain the transmitted signal. However, in some systems such as multi-tasking systems, the interrupts may be masked, or the host computer may be otherwise unable to execute software as required to maintain the transmitted signal. When the host computer is unable to respond, a lapse in transmission can occur, and the device at the other end of the communication link may disconnect or enter a retrain mode. This is unacceptable for modem users. Accordingly, an HSP communication system is needed which maintains a communication link even when a host computer is unable to respond to interrupts that for maintenance of a communication link.

SUMMARY OF THE INVENTION

As described in U.S. Pat. No. 5,721,830, hardware in an HSP communication system can include a circular transmit buffer. During normal operation, the host computer periodically adds samples to the circular buffer, for example during interrupts, and a digital-to-analog converter generates a transmitted analog communication signal from the samples in the circular buffer. However, if the host computer is unable to execute the routines that write new samples to the circular buffer, the digital-to-analog converter generates a maintenance signal by repeatedly converting old samples from the circular buffer until the host computer provides new samples. As an aspect of the present invention, a software circular buffer in the host computer stores samples for maintenance of the transmitted signal. A direct transfer such as a transfer according to the PCI bus master protocol or a DMA (direct memory access) transfer directly moves samples between software circular buffers in the host computer and the HSP modem hardware. The HSP modem hardware typically includes a hardware circular buffer that is smaller and less expensive than the required circular buffer size for maintenance of a suitable transmitted signal.

In one embodiment of the invention, the size of the software circular buffer depends on a sampling frequency of the digital-to-analog converter in HSP modem hardware, a baud frequency of the communication signal, and a carrier frequency if the communication signal has one. In particular, the software circular buffer holds samples for a whole number of periods at the carrier and/or baud frequencies. Thus, the maintenance signal is periodic at the carrier and/or baud frequencies and relatively smooth at transitions from the last sample to the first sample in the circular buffer. The software circular buffer may have a programmable size that is able to match a variety of possible carrier and/or baud frequencies for different communication protocols. Additionally, the software buffer holds sufficient samples so that the time required to convert a buffer full of samples is greater than the time between scheduled interrupts by an anticipate latency of the host CPU's response to an interrupt. In the event that the host processor does not respond to an interrupt by generating new samples within the anticipated time, the software circular buffer provides old samples for maintenance of a transmitted communication signal.

The hardware buffer, which receives direct transfers from the software circular buffer, has a size that depends on the latency or maximum anticipated delay between consecutive transfers. The size of the hardware circular buffer may further depends on a sampling frequency of the digital-to-analog converter in HSP modem hardware, the baud frequency of the communication signal, and the carrier frequency (if the communication signal has one). In the event that direct transfers are not completed within the expected time, repeated conversion of samples from the hardware buffer maintains the transmitted communication signal.

Although the maintenance signal may represent incorrect data when the host computer fails to execute the software that generates new samples or the direct transfers are delayed, the maintenance signal is typically sufficient to maintain a communication link and prevent a remote device from disconnecting or entering a retrain mode. Error correction techniques detect and possibly correct invalid data conveyed when HSP hardware generated the transmitted signal from reused samples. Typically, valid data is transmitted to and requested from the remote device when the host computer is again able to execute the software required for operation of the HSP communication system.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
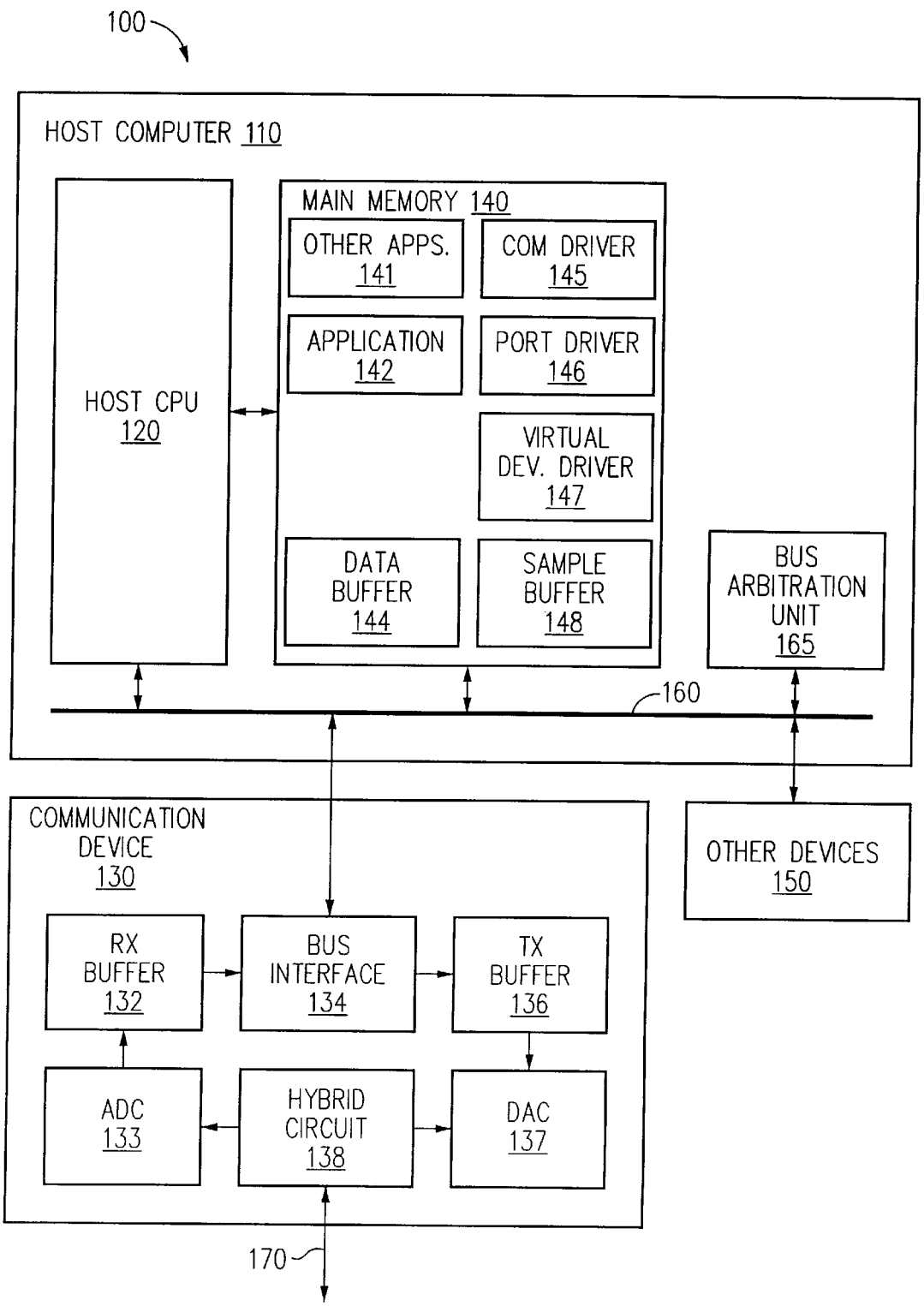
FIG. 1 is a block diagram of a host signal processing communication system in accordance with an embodiment of the invention.

FIG. 1 shows a block diagram of a host signal processing (HSP) communication system 100 that includes a host computer 110 and a communication device 130. Device 130 communicates with a remote device (not shown) through a communication link 170 and includes a hybrid circuit 138 that provides the necessary hardware connection to link 170. Device 130 also contains an analog-to-digital converter (ADC) 133 and a digital-to-analog converter (DAC) 137. ADC 133 samples the amplitude of an analog communication signal received on communication link 170 and stores digital samples in an RX buffer 132 in device 130. DAC 137 converts samples from a TX buffer 136 in device 130 to an analog communication signal transmitted on communication link 170. Host computer 110 generates the samples that are routed to TX buffer 136 and processes the samples from RX buffer 132. These samples pass between device 130 and host computer 110 via a local bus 160 of host computer 110 and a bus interface 134 in device 130. In an exemplary embodiment of the invention, host computer 110 is an IBM or compatible personal computer, and local bus 160 is a PCI bus.

Host computer 110 includes a CPU 120 which executes software under TM supervision an operating environment such as Microsoft WINDOWS95™. In accordance with the embodiment of FIG. 1, CPU 120 has a main memory 140 and executes an application 142 and other applications 141 stored in memory 140. Application 142 communicates with the remote device via communication link 170 and stores data in a data buffer 144 in memory 140 for transmissions to the remote device. Applications that communicate with remote devices are well known and may be configured, for example, for communication via a conventional modem. Application 142 communicates with the HSP communication system of the present invention in the same manner as with a conventional modem. In particular, application 142 or other routines in the operating environment can communicate with device 130 via a communication (COM) driver 145. COM driver 145 in turn calls a port driver 146 for the port to which device 130 is logically connected, and port driver 146 calls a virtual device driver 147. Device driver 147 is customized for device 130 and includes a software universal asynchronous receiver transmitter (UART) and a software portion of the HSP communication system. A software UART allows communications using standard applications, system routines, and communication ports in the operating environment of host computer 110 even when interface 134 is non-standard and tailored to the functions of device 130. U.S. Pat. No. 5,787,305, which is incorporated by reference above, describes circuits and processes for implementing a software UART with hardware having a non-standard I/O interface.

For data transmission, application 142 stores data in data buffer 144, and host CPU 120 periodically executes an update routine from device driver 147 to convert the data in data buffer 144 to digital samples of an analog signal representing the data. CPU 120 typically executes the update routine in response to interrupts from device 130. The series of digital samples are amplitudes of an analog communication signal that complies with a communication protocol. The communication protocol employed in system 100 depends on communication link 170 and the remote device. Communication protocols are available for a great variety of applications including modems, facsimile machines, and video phones operating at various data rates. Examples of well known communication protocols include V.17, V.21, V.22bis, V.27ter, V.29, V.32bis, V.34, and V.PCM. Device driver 147 implements one or more communication protocols as required for communication link 170 to the remote device. The protocol can be changed in software for a new or different application of system 100. Device 130 requires little or no change for different protocols.

Device driver 147 stores newly generated digital samples in a sample buffer 148 for transfer to device 130. When host computer 110 executes the update routine during interrupts initiated by an interrupt queue (IRQ), other applications 141 in a multi-tasking environment can mask interrupts causing host computer 110 to delay or skip execution of the update routine that generates new samples representing the transmitted signal. When this happens, new samples may not be available when required. If the transmitted signal from device 130 is stopped for lack of new samples, the remote device connected to communication link 170 might disconnect from link 170 or enter a retraining mode. Accordingly, sample buffer 148 is a circular buffer that provides old samples to device 130 for generation a maintenance signal. The maintenance signal complies with the communication protocol and maintains the link with the remote device.

Transfers to and from sample buffer 148 proceed directly between buffer 148 and device 130 without intervention of host CPU 120. Specifically, interface 134 in device 130 periodically requests access to memory 140 for transfer of samples to or from sample buffer 148. Transfers can be conducted, for example, according to the PCI bus master protocol or via a DMA channel or a similar high speed channel between device 130 and host computer 110. A bus arbitration unit 165 arbitrates between the request from device 130 and any requests from other devices 150 connected to bus 160. In the exemplary embodiment, bus arbitration unit 165 implements the PCI bus master protocol and grants each requesting device a 14-$\mu$s access to bus 160 in the order of the requests. The maximum latency for a direct transfer depends on the number of devices coupled to bus 160 and occurs when each device on bus 160 nearly simultaneously requests access. To provide tolerance for the latency of direct transfers, hardware buffers 132 and 136 have a size that is greater than the number of samples converted in the time between consecutive requests for transfers in the same direction. Hardware buffers 132 and 136 can be FIFO buffers or circular buffers as described below.

Figure 2:
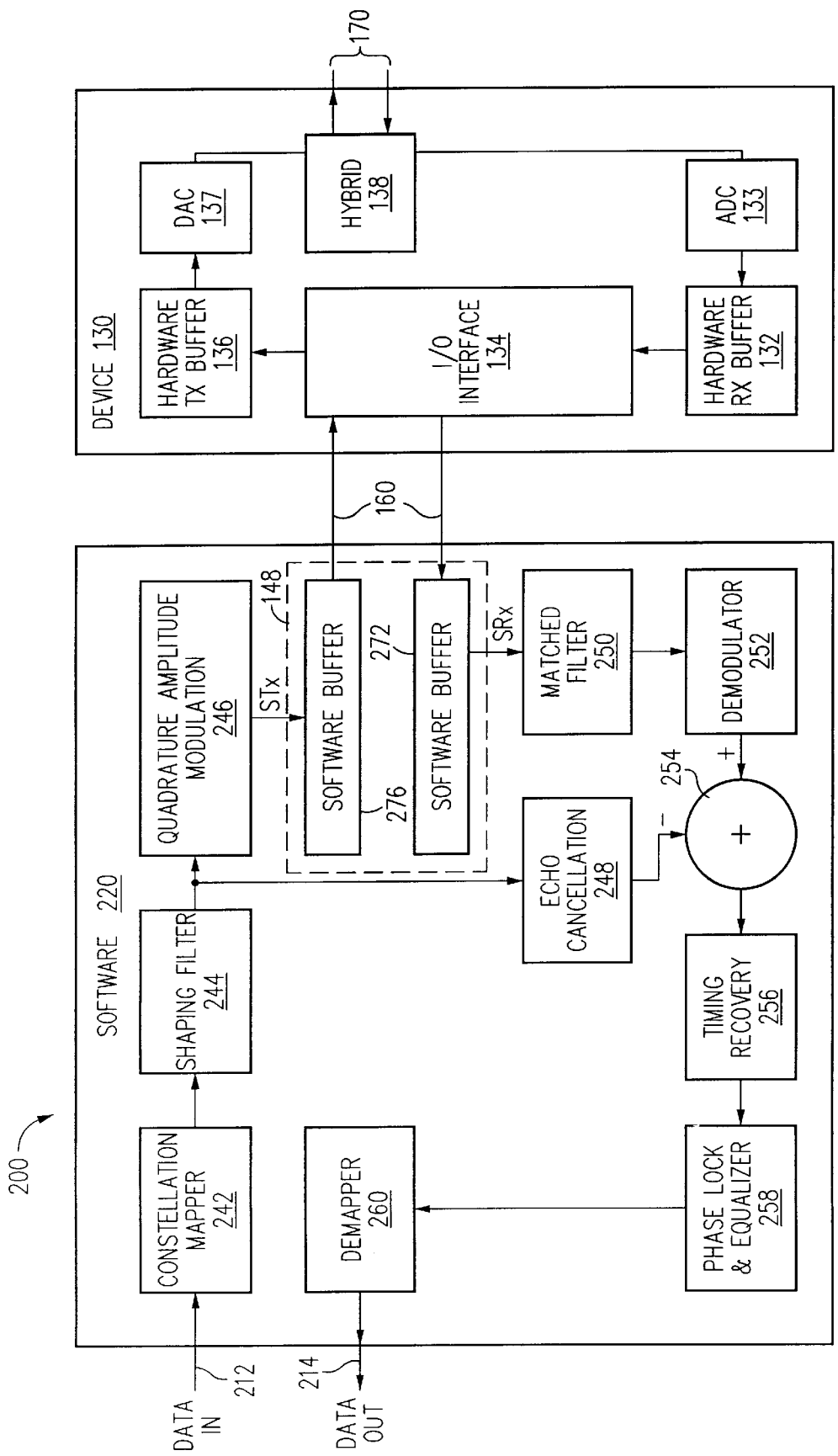
FIG. 2 is a block diagram of a host signal processing modem using a software circular buffer and direct transfers of samples between software and hardware portions of the modem.

FIG. 2 shows a block diagram of an HSP modem 200 which contains software 220 and device 130. In relation to FIG. 1, software 220 is part of device driver 147 and operates on a data stream 212 from data buffer 144. Device 130 includes interface 134, RX buffer 132, a TX buffer 136, ADC 133, DAC 137, and hybrid circuit 138 as described above. Software 220 generates a series of samples STx representing amplitudes of a transmitted signal that complies with a communication protocol and process samples SRx to extract data from a received signal. Samples STx and SRx are conveyed between software 220 and device 130 by direct transfers without intervention of the host processor.

To generate samples STx, software 220 partitions data stream 212 into packets of bits, where each packet corresponds to a symbol transmitted during one period of a baud frequency (or baud rate) fb. The baud frequency fb and the number of bits in a packet depend on the communication protocol implemented. A common class of communication protocols defines analog communication signals having a carrier frequency fc and variations at baud frequency fb. Protocols using pulse amplitude modulation such V.PCM do not have a carrier frequency fc but do have a baud frequency fb. Software 220 illustrates an example where the communication protocol uses quadrature amplitude modulation (QAM) of symbols represented by the communication signals. To implement conventional QAM, a constellation mapper 242 maps each packet from data stream 212 to the co-ordinates of a point in a plane. In one embodiment, each packet contains two bits, and constellation mapper 242 consecutively maps each packet to one of four points defined by the protocol. For example, values 00b, 01b, 10b, and 11b are mapped to co-ordinates (A, B) which equal (−1,−1), (−1,1), (1,−1), and (1,1) respectively for compliance with a protocol such as V.22. In another embodiment, each packet contains four bits which constellation mapper 242 maps to co-ordinates representing one of 16 points for compliance with a protocol such as V.22bis.

Constellation mapper 242 provides a stream of co-ordinates A(i) and B(i) where i is an index that numbers the periods at baud frequency fb. A shaping filter 244 filters the time variation of co-ordinates A(i) and B(i) and performs interpolation to create a stream of co-ordinates A'(j) and B'(j) where j is an index that numbers periods of the sampling frequency fs. Co-ordinate streams A'(j) and B'(j) have narrower bandwidths than co-ordinate streams A(i) and B(i). A QAM unit 246 performs a function look-up or otherwise determines samples STx(j) from co-ordinates A'(j) and B'(j) using Equation 1.

$$STx(j)=A'(j)*\cos(2\pi(fc/fs)*j)-B'(j)*\sin(2\pi(fc/fs)*j) \qquad \text{Equation 1}$$

Software 220 then writes samples STx(j) to a software circular TX buffer 276 within sample buffer 148.

Interface 134 periodically requests direct transfers of samples from buffer 276 and stores the samples in hardware TX buffer 136. DAC 137 converts samples STx(j) into the transmitted communication signal. TX buffer 136 provides samples to DAC 137 even if direct transfers fail to provide new samples in time for generation of transmitted signal. This can be accomplished by making TX buffer a FIFO buffer or a circular buffer. In embodiments where TX buffer is a FIFO buffer, direct transfers load TX buffer 136 with a reserve of samples so that conversion can continue through the maximum latency of a direct transfer without emptying TX buffer 136 of all new samples. When TX buffer 136 is a circular buffer, old samples from TX buffer 136 are reused when new samples are not provided in time for conversion. Accordingly, device 130 maintains a transmitted signal even if direct transfers fail to provide new samples. The size of a hardware circular buffer and a sampling frequency fs of DAC 137 can be selected so that samples in the hardware circular buffer represent a whole number of complete periods at baud frequency fb and/or a whole number of complete periods at carrier frequency fc if the protocol has a carrier frequency. In general, the carrier and baud frequencies fc and fb should be an integer multiple of the sampling frequency fs divided by the size of circular buffer 236. For example, if the transmitted signal has carrier frequency fc of 1800 Hz and baud frequency fb of 2400 Hz, and DAC 137 has a sampling frequency of 7200 Hz, a buffer capacity that stores 12 digital samples holds samples for three periods at the baud frequency and four periods at the carrier frequency.

Device 130 converts the communication signal received via link 170 into a series digitized samples SRx(j) which are initially stored in hardware RX buffer 132. Interface 134 periodically requests direct transfers of samples from hardware RX buffer 132 to a software RX buffer 272 in sample buffer 148. In response to periodic interrupts, a matched filter 250 filters received samples SRx(j) from software buffer 272 to remove noise and generate a received base band signal SRx'(j). Signal SRx'(j) represents the real part of $[C''(j)+i*D''(j)]*e^{i\{2\pi j(fc/fs)\}}$ where i is the squareroot of −1. A demodulation procedure 252 performs an inverse transform, i.e., $SRx'(j)*e^{-i\{2\pi j(fc/fs)\}}=C''(j)+i*D''(j)$, to determine recovered baseband signals C''(j) and D''(j) which indicate the co-ordinates a data point in the constellation map of data values.

A number of concerns must be addressed when converting baseband signals C'' and D'' into data values. One concern is noise such as echoes that occur in device 130 and on communication link 170. Another concern is synchronizing samples with the baud and carrier frequencies used by the remote device on link 170. An echo cancellation process 248 stores co-ordinates A' and B' that were previously sent to device 230 and/or transmitted on communication link 170. Baseband signals C'' and D'' are compared to the previous values of co-ordinates A' and B' to determine what portion of baseband signals C'' and D'' are due to echoes. In one embodiment, two types of echoes are considered a near end echo and a far end echo. Best fit delays and magnitudes are determined for both echoes. To cancel the echo, an adder 254 changes baseband signals C'' and D'' by an amount determined from co-ordinates A' and B' to provide echo corrected baseband signals C' and D'.

Echo cancellation process 248 maintains a buffer filled with co-ordinates A' and B' for samples just transmitted. As discussed below, when interrupts are missed, device 130 continues to transmit a communication signal based on old samples from software TX buffer 276 or hardware TX buffer 136 even though the host computer does not provide new samples. After a missed interrupt, echo cancellation process 248 is deactivated, and the echo cancellation buffer is flushed to remove co-ordinates that may differ from the samples converted by DAC 137. Echo cancellation process 248 is only resumed after the echo cancellation buffer is full of correct co-ordinate values.

A timing recovery process 256 determines the baud frequency fb of the remote device and combines the values C'(j) and D'(j) into average co-ordinates C'(i) and D'(i) which are averaged over a period of the baud frequency fb of the remote device. Co-ordinates C'(i) and D'(i) are typically not exactly equal to the co-ordinates of one of the selected points defined by the communication protocol. A phase lock and equalization procedure 258 shifts values C'(i) and D'(i) to values C(i) and D(i) that are exact for one of the selected points of the protocol. A demapper 260 then maps values C(i) and D(i) to a corresponding packet of data bits that are part of an output data stream 214. Other operations according to the protocol such as error detection and error correction are then performed on the data before storing the data in data buffer 144 for application 142.

Software 220 is executed in response to interrupts to convert data stream 212 to samples STx representing the transmitted communication signal and to convert samples SRx representing the received communication signal to data stream 214. Device 130 schedules regular interrupts of the host processor requesting that the host processor execute software 220. If interrupts are not masked and the host processor has sufficient processing power, the host processor executes software 220 at each interrupt, and software 220 generates new samples STx at an average rate matching the average direct transfer rate to device 130. Software 220 also processes received samples SRx at an average rate equal to the average rate of sample generation and direct transfer from device 130. However, if the host processor is unable to execute software 220 during each scheduled interrupt, the direct transfer rates may exceed the rate of generation of samples STx and processing of samples SRx.

Software buffers 272 and 276 are circular buffers so that direct transfers eventually overwrite unprocessed samples SRx in buffer 272 and repeatedly retrieve old samples STx from buffer 276. To implement a software circular buffer, the host computer initializes configuration registers in interface 134 to indicate the first and last storage locations in software buffers 272 and 276. Interface 134 requests a direct transfer of a block of samples starting at the first storage location of a buffer after a request of a direct transfer including the last storage location but otherwise requests direct transfers of sequential blocks of samples. In accordance with an aspect of the invention, software buffer 276 has a size selected so that at the sampling frequency fs of DAC 137, buffer 276 holds samples STx corresponding to an integer number of complete periods at baud frequency fb and an integer number of complete periods at carrier frequency fc if the communication signal has one. Software buffers 272 and 276 are generally larger than hardware buffers 132 and 136 and typically have a capacity that is an integer multiple of the capacity of buffers 132 and 136. When the host processor is unable to execute software 220 and generate new samples as required to generate a transmitted signal, direct transfers continue to repeatedly transfer the same samples from buffer 276, and DAC 137 repeatedly converts old samples to a transmitted signal sufficient to keep a remote device on a communication link. Since buffer 276 contains samples representing full periods of the transmitted signal, the transition from a sample at one end of software buffer 276 to a sample at the other end does not create a signal discontinuity violating the communication protocol of the transmitted signal. Accordingly, a remote device remains on communication link 170 where otherwise the remote device would disconnect if hardware 130 generated no transmitted signal or a transmitted signal having discontinuities in violation of the protocol.

Although the invention has been described with reference to particular embodiments, the description is only an example of the invention's application and should not be taken as a limitation. Various adaptations and combinations of features of the embodiments disclosed are within the scope of the invention as defined by the following claims.

I claim:

1. A communication system comprising:
   a host computer including a main processor and a memory;
   a buffer allocated in the memory;
   a program executed by the host computer, wherein the execution of the program generates digital samples representing amplitudes of an analog communication signal and writes the digital samples to the buffer; and
   a device coupled to the host computer, the device comprising:
   an interface initiating direct transfers of the digital samples from the buffer into the device without direction from the main processor, the direct transfers transferring samples in order from the buffer, wherein transfer of a sample from a first storage location in the buffer immediately follows transfer of a sample from a last storage location in the buffer; and
   a digital-to-analog converter that converts digital samples from the buffer to maintain a continuous, transmitted analog communication signal.

2. The system of claim 1, wherein the program comprises a routine for execution by the host computer in response to an interrupt signal.

3. The system of claim 1, wherein the digital-to-analog converter converts the samples at a sampling frequency, and a carrier frequency of the analog communication signal is an integer multiple of the sampling frequency divided by a number of storage locations used in the buffer.

4. The system of claim 3, wherein a baud frequency of the analog communication signal is an integer multiple of the sampling frequency divided by the number of storage locations used in the buffer.

5. The system of claim 1, wherein the digital-to-analog converter converts samples from the buffer at a sampling frequency, and a baud frequency of the analog communication signal is an integer multiple of the sampling frequency divided by a number of storage locations used in the buffer.

6. The system of claim 1, wherein:
   the device further comprises a hardware circular buffer coupled between the interface and the digital-to-analog converter;
   the interface transfers samples from the buffer in the memory of the host computer to the hardware circular buffer; and
   the digital-to-analog converter that converts digital samples from the hardware circular buffer into an analog communication signal.

7. The system of claim 6, wherein the digital-to-analog converter converts samples from the circular buffer at a fixed sampling frequency, and a baud frequency of the analog communication signal is an integer multiple of the sampling frequency divided by a number of storage locations used in the hardware circular buffer.

8. The system of claim 7, wherein the buffer in the memory of the host computer has a capacity that is an integer multiple of the number of storage locations used in the hardware circular buffer.

9. The system of claim 1, wherein the host computer further includes a local bus to which the device is coupled.

10. The system of claim 9, wherein the local bus is a PCI bus, and the direct transfers are implemented in accordance with the PCI bus master protocol.

11. A method for generating a communication signal, comprising:
    generating, in a host computer, a series of digital samples that represent an analog signal in compliance with a communication protocol;
    writing the digital samples to a buffer allocated in a memory of the host computer;
    transferring samples via direct transfers according to a circular ordering of storage locations, from the buffer to a device coupled to the host computer, the direct transfers being initiated independent of actions of the host computer, wherein when generating and writing the samples to the buffer fails to write new samples when required for one of the direct transfers, that direct transfer transfers samples that were previously transferred from the buffer; and converting the digital samples into analog voltages in the communication signal, wherein the converting maintains the communication signal when generating and writing the samples to the buffer fails to write new samples when required for one of the direct transfers.

12. The method of claim 11, wherein when generating and writing the samples to the buffer fails to write new samples when required for one of the direct transfers, converting the digital samples comprises converting the digital samples twice.

13. The method of claim 11, wherein:

transferring samples comprises periodically requesting direct transfers from the buffer; and when a request is granted, transferring samples to a hardware circular buffer in the device; and converting the digital samples comprises converting the digital samples in circular order from the circular buffer, and converting some of the digital samples twice when a request of a direct transfer is not granted in time to transfer new samples to the hardware circular buffer when required for conversion.

14. The method of claim 13, wherein converting the digital samples converts digital samples at a sampling frequency, and a baud frequency of the analog communication signal is an integer multiple of the sampling frequency divided by a number of storage locations used in the hardware circular buffer.

15. The method of claim 14, wherein the buffer allocated in the memory of the host computer uses a number storage locations that is an integer multiple of the number of storage locations used in the hardware circular buffer.

16. The method of claim 11, wherein the device is connected to a PCI bus in the host computer and the direct transfers are according to the PCI bus master protocol.

17. The method of claim 11, wherein converting the digital samples converts digital samples at a sampling frequency, and a baud frequency of the analog communication signal is an integer multiple of the sampling frequency divided by a number of storage locations used in the buffer.

18. A method for generating a communication signal, comprising:

in response to interrupts of the host computer, executing a program in a host computer to generate a series of digital samples which represent an analog signal in compliance with a communication protocol;

writing the digital samples to a buffer in the host computer;

transferring the digital samples via direct transfer from the buffer to a device coupled to the host computer;

converting the digital samples into analog voltage levels of the communication signal; and in response to one or more of the interrupts for which writing digital samples to the buffer does not occur, maintaining the communication signal by repeating transferring and converting of digital samples stored in the buffer.

19. The method of claim 18, further comprising generating the interrupts of the computer system, wherein the interrupts are separated by a time which causes an average rate at which the digital samples are generated to be equal to an average rate at which the digital samples are transferred via the direct transfers.

20. A communication system comprising:

a program executable by a computer, wherein execution of the program generates digital samples representing amplitudes of an analog communication signal and writes the digital samples to a memory of the computer; and a device adapted for connection to the computer, the device comprising:

an interface initiating [implementing] direct transfers of digital samples from a memory of the host computer to the device without direction from the computer, wherein the direct transfers repeat, in a circular fashion, accesses of storage locations in the memory; and a converter that converts the digital samples to maintain a continuous, analog communication signal.

21. The communication system of claim 20, wherein the device further comprises a circular buffer, wherein the direct transfers transfer digital samples to the circular buffer and the converter coverts the digital samples from the circular buffer.

22. The system of claim 20, wherein:

the program comprises a routine for execution by the computer in response to an interrupt signal; and the interface conducts the direct transfers independently of whether the host computer fails to execute the routine in response to the interrupt signal.

* * * * *

UNITED STATES PATENT AND TRADEMARK OFFICE
CERTIFICATE OF CORRECTION

PATENT NO.    : 6,112,266
DATED         : August 29, 2000
INVENTOR(S)   : Han C. Yeh It is certified that error appears in the above-identified patent and that said Letters Patent is hereby corrected as shown below:

Column 2,
Line 54, delete "depends" and insert -- depend --;

Column 3,
Line 43, delete "TM";

Column 6,
Line 6, delete "236" and insert -- 136 --; and
Line 34, delete "230" and insert -- 130 --.

Signed and Sealed this

Fourteenth Day of January, 2003

JAMES E. ROGAN
*Director of the United States Patent and Trademark Office*